United States Patent
Epstein

(10) Patent No.: US 8,132,264 B2
(45) Date of Patent: Mar. 6, 2012

(54) ACCESS AUTHORIZATION ACROSS PROCESSING DEVICES

(75) Inventor: Michael A. Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1189 days.

(21) Appl. No.: 11/568,484

(22) PCT Filed: May 2, 2005

(86) PCT No.: PCT/IB2005/051423
§ 371 (c)(1),
(2), (4) Date: Oct. 30, 2006

(87) PCT Pub. No.: WO2005/106870
PCT Pub. Date: Nov. 10, 2005

(65) Prior Publication Data
US 2008/0134345 A1 Jun. 5, 2008

Related U.S. Application Data

(60) Provisional application No. 60/567,977, filed on May 4, 2004.

(51) Int. Cl.
*G06F 21/00* (2006.01)

(52) U.S. Cl. .......... 726/28; 713/167; 713/168; 713/176; 713/181; 380/267; 380/257; 380/202; 386/218; 386/219; 386/220

(58) Field of Classification Search .......... 380/201–203, 380/257, 267, 167; 725/31; 382/100; 713/176, 713/186, 167, 168, 181, 201; 386/98, 125
See application file for complete search history.

(56) References Cited

U.S. PATENT DOCUMENTS

| 5,923,754 | A | 7/1999 | Angelo et al. | |
|---|---|---|---|---|
| 7,216,232 | B1 * | 5/2007 | Cox et al. | 713/176 |
| 7,224,819 | B2 * | 5/2007 | Levy et al. | 382/100 |
| 7,526,785 | B1 * | 4/2009 | Pearson et al. | 725/31 |
| 7,639,835 | B2 | 12/2009 | Hayashi | |
| 2002/0012432 | A1 | 1/2002 | England et al. | |
| 2002/0021805 | A1 * | 2/2002 | Schumann et al. | 380/201 |
| 2002/0178368 | A1 * | 11/2002 | Yin et al. | 713/186 |
| 2003/0149872 | A1 | 8/2003 | Harrison et al. | |

FOREIGN PATENT DOCUMENTS

| EP | 1045585 A | 10/2000 |
|---|---|---|
| JP | 2002237941 A | 8/2002 |
| KR | 20020066203 A1 | 8/2002 |
| WO | WO03034428 A2 | 4/2003 |

* cited by examiner

*Primary Examiner* — Vivek Srivastava
*Assistant Examiner* — Hee Song

(57) ABSTRACT

Authentication information (125) obtained by a device (100) at one level of a transformation sequence is securely communicated to another device (200) at another level of the transformation sequence. To assure that the communicated authentication information (125) is not merely a copy of previously communicated authentication information, each communication (145) includes an item (255) that the receiving device (200) can verify as having been recently generated.

26 Claims, 1 Drawing Sheet

ACCESS AUTHORIZATION ACROSS PROCESSING DEVICES

CROSS REFERENCE TO RELATED CASES

Applicant(s) claim(s) the benefit of Provisional Application Ser. No. 60/567,977, filed May 4, 2004.

This invention relates to the field of video processing, and in particular to the control of a display device to prevent unauthorized viewing of protected content material.

A variety of techniques have been developed to prevent the unauthorized rendering of playback-protected content material. When a conforming playback device detects information that identifies the material as being playback-protected, and does not detect suitable authorization information for this material, the device terminates the rendering of the protected content material.

Some of the techniques used to identify the material as being playback-protected provide identifying information in the format used to encode the video information, such as alteration of MPEG-encoded bit streams. Other techniques provide identifying information in the ancillary information provided with the material, such as in the "header" information on a DVD recording. Each of these techniques, however, eventually provides conventional video information to a display device, and an interception of this "unmarked" video information can be used to create unauthorized copies of the content material.

The more robust techniques for identifying protected video content material embed the protection information directly into the video images. Conventionally, this embedded information is termed a watermark, because, like the conventional paper watermark, the electronic watermark is designed to not interfere with the image quality, and yet to be virtually irremovable without causing substantial damage to the image.

By embedding the playback-protecting identification in the video image, playback protection can be provided by the display device, thereby preventing unauthorized display of the material regardless of how the material arrived at the display device. A conforming display device continually monitors the image information, and if protection information is detected without corresponding authorization information, the display device terminates the display of the image.

The prevention of an unauthorized display of protected content material via watermarks requires an ability to distinguish between authorized and unauthorized content material. That is, the enforcing system must be able to verify that the watermark corresponds to an authorization to render the protected content material; if not, the material is not rendered.

The security of a protection scheme is vulnerable if the device that determines the authorization is a different device than the one that determines the watermark and/or the device that verifies the authorization of the watermark. If the authorization is based on the digital form of the content material, but the watermark is authenticated after the digital information is transformed into another form for rendering, such as a video image, and the digital transformation is not performed in the rendering device, the security scheme can be compromised at the interface between the transformation device and the rendering device by making a copy of the authenticating information that is communicated to the rendering device during an authorized rendering, and using this copy to provide bogus authorization for unauthorized renderings.

It is an object of this invention to provide a security system and protocol that is suitable for authentication of watermarks between devices. It is a further object of this invention to provide a security protocol that facilitates the authentication of security items that are encoded at different transformation levels of the protected material.

These objects and others are achieved by a security protocol wherein the authentication information obtained by a device at one level of a transformation sequence is securely communicated to another device at another level of the transformation sequence. To assure that the communicated authentication information is not merely a copy of previously communicated authentication information, each communication includes an item that the receiving device can verify as having been recently generated.

The invention is explained in further detail, and by way of example, with reference to the accompanying drawings wherein.

Throughout the drawings, the same reference numeral refers to the same element, or an element that performs substantially the same function. The drawings are included for illustrative purposes and are not intended to limit the scope of the invention.

This invention is presented in the context of a video processing system wherein authentication information is determined at one device and verification of authorization to render protected content material based on this authentication information is performed at another device. For example, U.S. patent application Ser. No. 09/536,944, "PROTECTING CONTENT MATERIAL FROM ILLICIT REPRODUCTION BY PROOF OF EXISTANCE OF A COMPLETE DATA SET VIA SELF-REFERENCE SECTIONS", filed 28 Mar. 2000 for Michael A. Epstein and Antonius Starring, incorporated by reference herein, presents the use of a self-referential watermark to protect content material. As the name implies, a self-referential watermark is authenticated based on the information referenced by the watermark. For example, the watermark of a segment of protected material may contain a hash value of a combination of bytes in the segment, or in another segment of the protected material. A receiving device computes the hash of the combination of bytes in each received segment, and if the computed hash value matches the corresponding watermark, then the material is verified as being an unaltered copy of the original material. In this example, the hash of the received data is computed when the received content material is in digital form. As discussed above, if the watermark is embedded in the video image, the preferred location for enforcement of the watermark protection is at the rendering device that is providing a visual display of the information from its final analog or digital form. Assuming that the device that receives the digital information and computes the authentication information is distinct from the display device that preferably enforces the watermark protection, the receiving device must communicate the authentication information to the display device for the verification process.

In like manner, the receiving device may receive the authentication information from another source, or the provider of the authentication information may be a different device from either the receiving device or the display device. These and other configurations of devices that result in the generation of authentication information at one device and an enforcement of copyright protection at another device, as protected material is transformed from one form to another, will be evident to one of ordinary skill in the art.

Figure 1:
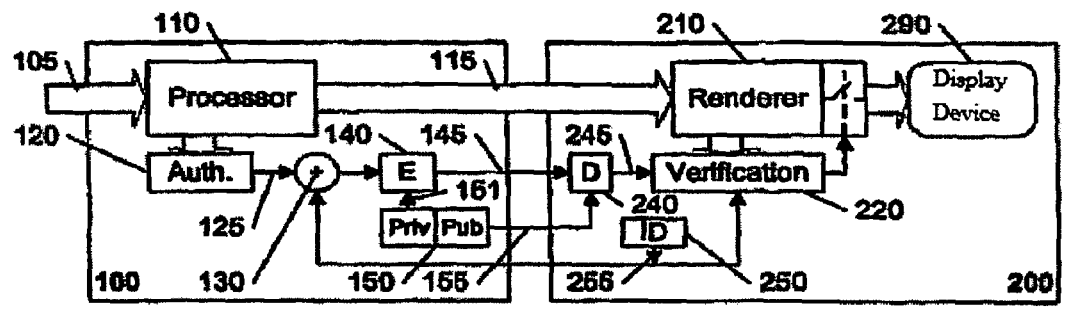
FIG. 1 illustrates an example block diagram of a rendering system in accordance with this invention.

FIG. 1 illustrates an example rendering system in accordance with this invention. As illustrated, a processing device 100 receives the protected content material in a first form 105, and transforms the material into a second form 115 that is suitable for display, via a processing module 110. A display device 200 receives the transformed information 115 and provides a visual image on a display screen 290, via a rendering module 210. For example, the processing device 100 may be a DVD player that reads digital information 105 from formatted segments of a DVD and transforms this information into a "video" format 115, such as S-video, NTSC, and so on. Note that the terms "processing" device and "display" device are used merely to identify two devices that are used to sequentially process content material during a typical rendering of the content material. One of ordinary skill in the art will recognize that the principles of this invention are generally applicable to any two devices that process information sequentially.

The processing device 100 includes an authentication module 120 that is configured to derive authentication information 125 that facilitates verification that the received material 105 is authorized. In the self-referential example embodiment, the authentication module 120 is configured to determine the hash value of each received segment, on the assumption that authorized material will contain watermarks that correspond to these hash values, as discussed above. Other means of determining authentication information 125 that facilitates the verification of a watermark are common in the art.

In the example system 100, the watermark is determinable from the information 115. In typical systems that enforce copyright protection, the processing device 100 is configured to determine the watermark from the information 115 and ceases transmission of the information 115 to the display device if the protected material is not verified as being authorized, based on the determined authentication information. However, as noted above, such a protection scheme does not prevent the unauthorized viewing of protected material that is provided to the display device 200 without this verification test.

In the example system 100, the display device 200 enforces the copy protection whenever watermarked material 115 is provided for display, via a verification module 220. In this manner, the protection can be provided for as long as the watermark remains with the material 115, or copies of the material 115.

For the display device 200 to enforce the protection provided by the watermark, the verification module must be provided the authentication material 125 to determine whether the watermarked material is authorized. In the example self-referential embodiment, the verification module needs the hash values of the received segments to compare with the watermarks.

A variety of schemes are available for effecting a secure communication of the authentication information 125 from the processing device 100 to the display device 200. However, because the information 125 must be communicated between the devices, it is susceptible to interception. If the information 125 is intercepted and copied, this copied authentication information could be used to allow subsequent unauthorized renderings of the material 115, or copies of the material 105 or 115.

For example, the example self-referential protection scheme of aforementioned U.S. patent application Ser. No. 09/536,944 is intended to reduce the potential for widespread distribution of protected material by encoding it in a form that is inefficient for communications over the Internet. If the material 105 is converted to a compressed form that is suitable for efficient Internet distribution, a hash of the compressed segments, or reconstituted uncompressed segments, will not match the watermark, due to the data loss inherent in the common compression formats. However, if copies of the proper hashes 125 from the original material 105 are made available, unauthorized compressed copies could be rendered at the display device by providing the copy of proper hashes 125 to the display device in lieu of the improper hashes that the processing device would produce from the compressed material. Even if the proper hashes are encrypted prior to transmission to the display device, a copy of this encrypted information 145 could subsequently be provided to the display device in lieu of encrypted erroneous hashes from the compressed copy of the material 105.

In accordance with this invention, the display device 200 and processing device 100 are configured to assure that the information transmitted 145 to the display 200 is generated contemporaneously with each display of the material 115. In the example embodiment of FIG. 1, the display device 200 includes a transaction identification generator 250 that is configured to generate a transaction identifier 255 for each submission of material 115 to the display device 200. This transaction identifier 255 is communicated to the provider 100 of the authentication information 125.

In accordance with this invention, the identifier 255 is bound to each transmission of authentication information 125. In the example embodiment of FIG. 1, the binding is achieved by combining 130 the identifier 255 to the authentication information 125 prior to encryption by an encrypter 140, using a private key 151 of a public-private key pair 150 associated with the processing device 100. The encrypted composite 145 is transmitted to the display device, and decoded by a decoder 240. The decrypted composite 245 is provided to a verification module 220 that is configured to verify that each received composite 245 contains the transaction identifier 255. By verifying that the transaction identifier 255 is contained within each composite 245, it is assured that the encrypted material 145 was created after receipt of the current transaction identifier 255.

The verification module 220 is also configured to verify that the authentication information in the composite 245 corresponds to an authorization of the material 115, based on the watermark contained within the material 115, using techniques common in the art. For example, in the aforementioned self-referential watermarking system, wherein the authentication information includes the hash values of segments of the material 105, the verification module 220 is configured to compare the watermark within the material 115 to the corresponding received hash value. If the watermark matches the hash value, the material is authorized to be rendered; otherwise, the verification module prevents the further rendering of the material 115 on the screen 290.

Figure 2:
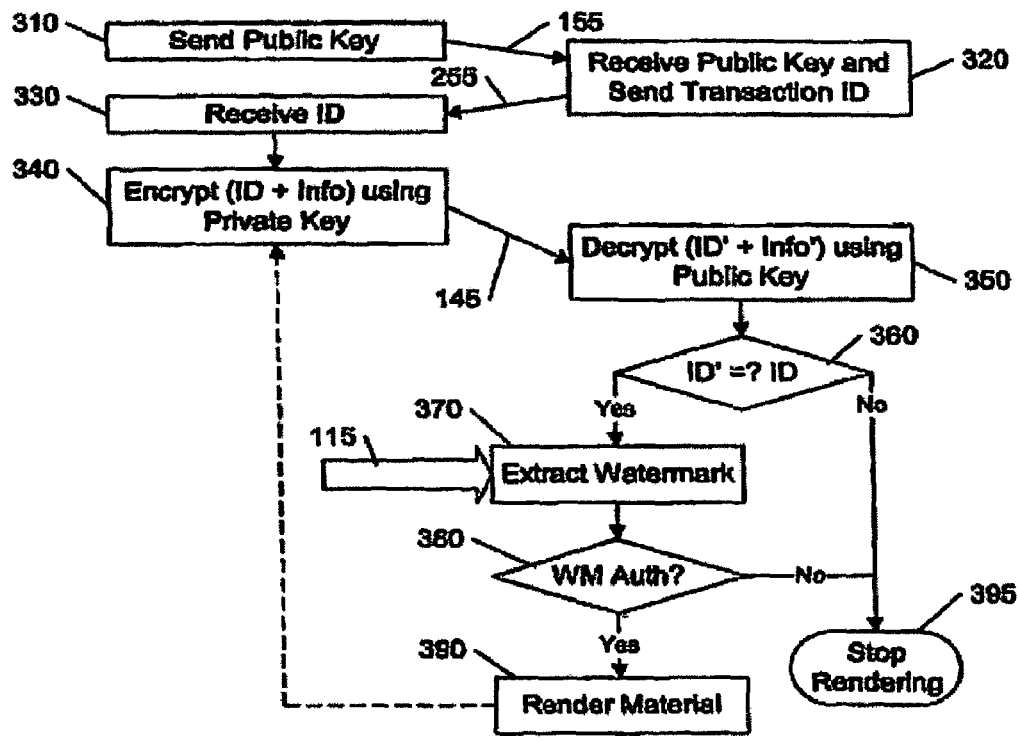
FIG. 2 illustrates an example flow diagram of a security protocol in accordance with this invention.

FIG. 2 illustrates a flow diagram of a security protocol for assuring a cotemporaneous communication of authentication information from a processing device 100 to a display device 200.

At 310, the processing device 100 communicates its public key 155 to the display device 200. This serves to alert the display device 200 to the start of a new transaction. Alternatively, the display device 200 may be configured to request the public key 155 whenever a watermark is first detected in material 115.

At 320, the display device 200 receives the public key 155 and generates a transaction identifier 255 that is transmitted to the processing device 100. Preferably, the transaction identifier 255 is fairly unique, such as a random number that is generated with each new transaction, a sequence number that is incremented with each transaction, a time-of-day stamp, and so on. The display device 200 may also be configured to verify that the public key 155 is associated with a conforming processing device 100, to further thwart unauthorized transactions.

At 330, the processing device 100 receives the identifier 255. This identifier 255 is subsequently bound to each transmission of authentication information from this processing device, thereby verifying that each transmission is generated contemporaneously with the time that the display device 200 created this transaction identifier 255.

In an example embodiment, the processing device 100 binds the identifier 255 with the authentication information 125 by encrypting a combination of both the identifier 255 and the authentication information 125 to form the encrypted information 145 that is communicated to the display device, at 340.

At 350, the display device 200 uses the public key 155 to decrypt the encrypted combination of the identifier 255, and the authentication information 125. If, at 360, the received decrypted identifier ID' matches the transmitted session identifier ID 255, the display device 200 is assured that it is receiving cotemporaneous communications from the processing device 100, and the process continues; otherwise, the process is terminated, at 395.

At 370, the watermark WM is extracted from the protected material.

At 380, the decrypted information Info' is used to determine whether the watermarked material is authorized. In the example self-referential watermarking process, the decrypted authentication information Info' is the hash value of the received segments; if the watermark WM matches the hash value of the received segments, the material is deemed authorized, and rendering continues, at 390. Otherwise, the process terminates, at 395. The processes 340-390 continue until this transaction is terminated, typically after the entirety of the received material is rendered.

Because each transmission from the receiver 100 includes the transaction identifier 255 bound to the authentication information, the contemporaneous generation of the encrypted information 145 that is transmitted to the display device 200 is assured. In this manner, a copy of authentication information produced during some other transaction cannot be substituted to grant access to unauthorized material.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the identifier 255 is preferably bound to each transmission from the processing device, processing and transmission time may be reduced by binding the identifier 255 to fewer than the entirety of transmissions from the processing device 100. In like manner, the particular method used to bind the identifier 255 to the transmissions may differ than illustrated in the example figures. In like manner, the principles of this invention do not preclude the use of additional security control measures, including the encryption of some or all of the content material using the private key of the source, to verify that the source of the content material is the same source of the authentication information. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

The invention claimed is:

1. A rendering system comprising:
    a first device that is configured to:
       receive content material in a first form, transform the content material to a second form, and determine authentication information corresponding to the content material; and
    a second device that is configured to:
       receive the content material in the second form, receive the authentication information, and determine whether to process the content material based on the authentication information;
    wherein:
       the second device is further configured to provide a transaction identifier to the first device,
       the first device is further configured to bind the transaction identifier to the authentication information that is received by the second device, and
       the second device determines whether to process the content material based further on the transaction identifier that is bound to the authentication information by combining the identifier with the authentication information prior to encryption by an encrypter;
    wherein the first and second devices are configured to assure that the transaction identifier is generated contemporaneously with a display of the content material.

2. The rendering system of claim 1, wherein
    the first device includes a receiver that is configured to receive the content material from a media, and
    the second device includes a rendering device.

3. The rendering system of claim 1, wherein
    the first device includes a DVD player, and
    the second device includes a display.

4. The rendering system of claim 3, wherein
    the authentication information includes a hash value associated with at least a portion of the content material in the first form,
    the second device is configured to determine a watermark from the content material in the second form, and
    the second device determines whether to process the content material based at least in part on a comparison of the hash value with the watermark.

5. The rendering system of claim 4, wherein
    the transaction identifier corresponds to a random number.

6. The rendering system of claim 1, wherein
    the transaction identifier corresponds to a random number.

7. The rendering system of claim 1, wherein
the first device binds the transaction identifier to the authentication information by encrypting a combination of the transaction identifier and the authentication information.

8. The rendering system of claim 7, wherein
the first device provides a public key to the second device to facilitate decryption of the combination of the transaction identifier and the authentication information.

9. A rendering device comprising:
an interface that is configured to receive content material and authentication information from an other device during a transaction with the other device,
a renderer that is configured to provide a rendering of the content material,
a transaction identification module that is configured to provide an identifier of the transaction to the other device, and
a verification module that is configured to verify that the identifier is bound to the authentication information by combining the identifier with the authentication information prior to encryption by an encrypter from the other device during the transaction;
wherein the rendering device is configured to assure that the identifier is generated contemporaneously with a display of the content material.

10. The rendering device of claim 9, wherein
the interface is also configured to receive a public key from the other device, and
the rendering device further includes
a decryption module that is configured to decrypt transmissions from the other device using the public key to determine the authentication information and the identifier that is bound to the authentication information.

11. The rendering device of claim 9, wherein
the verification module prevents the rendering when the identifier is not bound to the authentication information.

12. The rendering device of claim 9, wherein
the rendering device includes a display for rendering visual images,
the visual images containing at least one watermark, and
the verification module is further configured to prevent the rendering of the visual images based on the watermark and the authentication information.

13. The rendering device of claim 12, wherein
the verification module prevents the rendering when the watermark does not correspond to the authentication information.

14. The rendering device of claim 9, wherein
the identifier includes a random number.

15. The rendering device of claim 9, wherein
the content information is received in a first form,
the authentication information includes a hash value corresponding to the content material in a second form that differs from the first form.

16. A processing device comprising:
a processor that is configured to process content material in a first form to form material in a second form,
an authentication module that is configured to determine authentication information from the content material in the first form, an interface that is configured to:
receive a transaction identifier from an other device,
bind the transaction identifier to the authentication information by combining the identifier with the authentication information prior to encryption by an encrypter, and
transmit the authentication information with the bound transaction identifier to the other device;
wherein the processing device in combination with the other device are configured to assure that the transaction identifier is generated contemporaneously with a display of the content material.

17. The processing device of claim 16, wherein
the interface includes
an encrypter that is configured to encrypt a combination of the transaction identifier and the authentication information, thereby binding the transaction identifier to the authentication information.

18. The processing device of claim 17, wherein
the encrypter encrypts the combination based on a private key of the processing device, and
the interface is further configured to transmit a public key corresponding to the private key to the other device.

19. The processing device of claim 16, wherein
the authentication module is configured to determine the authentication information by computing one or more hash values corresponding to one or more segments of the content material in the first form.

20. The processing device of claim 16, wherein
the processing device includes a DVD player, and
the other device includes a display device.

21. A method of protecting content material comprising:
transmitting a transaction identifier,
receiving content material and authentication information by a receiving device,
determining whether the transaction identifier is bound to the authentication information by a processing device, and
controlling the processing of the content material based on whether the transaction identifier is bound to the authentication information by combining the identifier with the authentication information prior to encryption by an encrypter;
wherein the processing and receiving devices are configured to assure that the transaction identifier is generated contemporaneously with a display of the content material.

22. The method of claim 21, further including
receiving a public key, and
decrypting the authentication information based on the public key.

23. The method of claim 21, further including
controlling the processing of the content material based on a security item in the content material and the authentication information.

24. The method of claim 23, wherein
the security item includes a watermark.

25. The method of claim 24, wherein
the authentication information includes a hash value corresponding to at least a portion of the content material.

26. The method of claim 21, wherein
the transaction identifier includes a random number.

* * * * *